United States Patent
Kumar et al.

(10) Patent No.: US 8,224,622 B2
(45) Date of Patent: Jul. 17, 2012

(54) METHOD AND APPARATUS FOR DISTRIBUTION-INDEPENDENT OUTLIER DETECTION IN STREAMING DATA

(75) Inventors: N Hari Kumar, Chennai (IN); J Mohamed Zahoor, Chennai (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 418 days.

(21) Appl. No.: 12/509,714

(22) Filed: Jul. 27, 2009

(65) Prior Publication Data

US 2011/0022354 A1    Jan. 27, 2011

(51) Int. Cl.
*G06F 17/18*    (2006.01)

(52) U.S. Cl. ........ 702/179; 702/180; 702/194; 707/776; 708/1

(58) Field of Classification Search ............. 702/179
See application file for complete search history.

(56) References Cited

U.S. PATENT DOCUMENTS

2003/0097385 A1*   5/2003   Lee et al. ............................ 708/1
2008/0234977 A1*   9/2008   Aggarwal et al. ............. 702/179

OTHER PUBLICATIONS

Matej Novotny and Helwig Hauser, "Outlier-preserving Focus+Context Visualization in Parallel Coordinates", Sep./Oct. 2006, IEEE Transactions on Visualization and Computer Graphics, vol. 12, No. 5, p. 893-900.*

Zhijian Yuan, et al. Stream Event Detection: A Unified Framework for Mining Outlier, Chang and Burst Simultaneously Over Data Stream. Seventh IEEE International Conference on Data Mining—workshops Oct. 28-31, 2007.

Sang-Hyun Oh. et al. Intrusion Detection Based on Clustering a Data Stream. Proceedings of the 2005 Third ACIS Int'l Conf on Software Engineering Research, Management and Applications. Aug. 11-13, 2005.

\* cited by examiner

*Primary Examiner* — Sujoy Kundu
*Assistant Examiner* — Haidong Zhang
(74) *Attorney, Agent, or Firm* — Roger S. Burleigh

(57) ABSTRACT

The present invention relates to an iterative method and an apparatus for distribution-independent detection of intermediate outliers and outliers in the distribution tail of streamed data. A considerable sequence of streamed data is sequentially read and subsequently assigned to matching bins. The bins are adaptively allocated when, where and if they are needed. Each bin range expands concurrently with the distribution range of the accumulating items assigned to the bin, adding a margin. For every N'th read item, overlapping or adjoining bins are merged, whereupon the bins are assessed for insider preclusion. Information regarding outliers is extracted from the remaining outlier bins when the entire data sequence has been processed.

12 Claims, 2 Drawing Sheets

METHOD AND APPARATUS FOR DISTRIBUTION-INDEPENDENT OUTLIER DETECTION IN STREAMING DATA

TECHNICAL FIELD

The present invention relates to data mining, and in particular to a method for assessing large amounts of data and identifying data sources that generate abnormal data. The invention also relates to an associated apparatus and a computer readable media including program instructions.

BACKGROUND

Outlier detection is an important and challenging aspect of data mining. An outlier is an anomaly—an observation that deviates in some computable aspect from other observations in a random sample of a population. The underlying causes of outliers can be human error or fraudulent behavior, defective instruments, changes in behavior of systems or system malfunction. Outlier detection is a critical task in many safety critical environments as the mere existence of outliers indicates abnormal running conditions from which significant performance degradation may result.

Applications such as fraud detection, network flow monitoring, telecommunications data management etc. generate unbounded data streams, unlike the related data found in traditional databases. An unbound data stream is an ordered sequence of data $X_\infty = (x_1, x_2, \ldots, x_\infty)$. As the data arrival is continuous, storing of all data would be extremely difficult, very impractical, and associated with huge storage management costs. Traditional data mining methods are often very theoretical and cannot effectively or efficiently be applied to streaming data as these methods are intended for applications and environments where a finite data set is stored in a local memory, and where each item in the dataset is available for repeated reading and processing. Additionally, applied to unbounded data streams, most methods are computationally expensive and time-consuming.

Further, due to the dynamic nature of e.g. human behavior and activities, property characteristics of a data stream of subscriber data change over time. Because of this, what may have been considered an outlier at one time may be a perfectly coherent observation after a certain time frame. Therefore, methods that rely on one evaluation per item as soon as it is read are not useful here.

In "Efficient Clustering-Based Outlier Detection Algorithm for Dynamic Data Stream" (CORM) (Manzoor Elahi, Kun Li, Wasif Nisar, Xinjie Lv, Hongan Wang, fskd, vol. 5, pp. 298-304, 2008 Fifth International Conference on Fuzzy Systems and Knowledge Discovery, 2008), the authors address the dynamic and unbounded properties of streaming data. In the CORM method, the data stream is divided in L chunks of n data and the chunks are then clustered in k clusters. L, n and k are required as input from the analyst. The analyst also has to define a distance function criterion and the location of the initial k cluster centers.

For every cluster, its outliers, its actual mean value and its updated mean value are saved for the next number of chunks. If the distance function between an object from chunk z and the closest cluster center is larger than the updated mean, the object is carried forward and clustered again with the next chunk z+1. The "safe region" grows as the updated mean radius grows. Data still outside of the updated mean radius when L chunks have been read are declared as outliers.

This method, as all clustering methods, is computationally intensive. Further it requires more than one pass over the data. The CORM method also requires considerable intermittent data storage, since two different mean values for each cluster, the number of clusters and all candidate outliers must be kept available.

Once the presence of outliers has been established, it is usually desirable to cleanse the data stream from these aberrations, which undetected may lead to incorrect results. One cause of under-detection of outliers is that the chosen detection method assumes conditions that do not apply to the population in question. Most methods, such as Z-score and Inter Quartile Range are parametric methods that assume a normal distribution. Used on a population with e.g. a heavy-tailed distribution, or a population which is a mixture of two sub-distributions, outliers, especially intermediate outliers, are likely to remain undetected. Telecom related data, such as charging data or other subscriber related data is among that group, following some power law distribution, and/or consisting of a mixed population.

Moreover, parametric methods are often unsuitable for those large data sets that are typically handled by Consumer Information Management Systems (CIM), which receives input values like Customer Data Record (CDR) flows. Typically, telecom data sets are huge—one single day of charging system data sums up to approximately 40 GB, which means that the memory requirements are excessive. This also means that when the data is finally assembled in the memory, processing time and efforts remain.

Hence there is a need for a method and an arrangement that address or diminish the problems mentioned above.

SUMMARY

It is the object to obviate at least some of the above disadvantages and provide an improved method, apparatus and computer media product avoiding the above mentioned drawbacks.

A first aspect of the invention is a distribution independent method for iteratively detecting outliers in streamed data. A data sequence $X_W$ comprised in the streamed data is being sequentially assigned to spatially and temporally adaptive bins. These bins further have expanding ranges. The method comprises the steps: reading each item x of the data sequence $X_W$ and assigning each item x to a bin having a range that comprises the item x. For every N'th read item, all bins with overlapping or adjoining ranges are being merged, and subsequently, the bins are being assessed for insider preclusion. Once the whole data sequence $X_W$ has been processed, information about remaining outliers can be extracted, and delivered as output.

The assigning step may comprise matching x against existing bins' range. If there is a match, a bin weight counter C of the matching bin is being incremented. If x furthermore lies within a predefined margin IMI from an expanding bound of the bin to which it has been assigned, the expanding bound is being expanded to x+M.

If there is no match however, a new bin is being created so that it has a fix bound equal to x, and an expanding bound equal to x+M. The new bin further has an associated bin weight counter C that is set to one.

The merging step may comprise determining, for each bin, if its expanding bound is overlapping or immediately adjoining a neighboring bin's fix bound. If this is the case, the steps of creating a merged bin having a fix bound identical to the original bin's fix bound, and an expanding bound identical to the neighboring bin's expanding bound; and setting a weight counter C of the merged bin equal to the sum of the original and neighboring bins' C's, are being executed.

The assessing step may comprise comparing a weight counter C of the bin to a predefined insider threshold T; and if C is equal or exceeds T, the bin is being identified as an insider bin.

The extracting step may comprise determining whether the entire XW has been processed; and if so: identifying as outlier bins all bins not previously identified as insider bins; and then extracting from identified outlier bins their respective bin bounds.

A second aspect of the invention is a computer readable media product including program instructions which when executed by a processor cause the processor to perform a method according to the first aspect of the invention.

A third aspect of the invention is an apparatus for distribution-independent iterative detection of outliers in streamed data. A data sequence $X_W$ comprised in the streamed data sequentially assigned to spatially and temporally adaptive bins. These bins further have expanding ranges. Said apparatus comprises an input unit, a processing unit, a cache memory and an output unit. The cache memory is adapted to store and alter data posts representing bins upon request. The processing unit is adapted to send such requests to the cache memory; read via the input unit each item x of $X_W$; assign each item x to a bin having a range that comprises item x; merge bins with overlapping or adjoining bounds for every N'th read item; assess bins for insider preclusion; extract outlier information when the entire $X_W$ has been processed; and deliver the outlier information to the output unit.

The processing unit may be adapted to match x against existing bins' ranges; and if there is a match,
  increment a bin weight counter C of the matching bin;
  if x lies within a margin |M| from the expanding bound of the bin to
  which it has been assigned, expand the expanding bound to x+M;
if there is no match, however,
create a new bin with a fix bound equal to x, and an expanding bound equal to x+M; and set a bin weight counter C to one.

The processing unit may further be adapted to:
compare, for each bin, if its expanding bound is overlapping or immediately adjoining a neighboring bin's fix bound; and if so:
create, and store in the cache memory, a merged bin with a fix bound identical to the original bin's fix bound, and an expanding bound identical to the neighboring bin's expanding bound; set a weight counter C associated to the merged bin equal to the sum of the original and neighboring bins' C's.

The processing unit may further be adapted to assess the bin through comparing a weight counter C to a predefined insider threshold T; and if C is equal to or exceeds T, identify the bin as an insider bin.

The processing unit may further be adapted to determine when the entire $X_W$ has been processed; and thereafter to identify as outlier bins all bins not previously identified as insider bins; and extract and compile an outlier information data file.

BRIEF DESCRIPTION OF THE DRAWINGS

In order to explain the invention in more detail, embodiments will be described in detail below, reference being made to the accompanying drawings, in which.

DETAILED DESCRIPTION

For the understanding of this disclosure, the overall objective of the present invention is to detect outliers, but it is a problem that most available methods assume that the data is distributed according to some particular distribution, usually the normal distribution. Especially, this becomes a problem for applications where the data is generated due to human activity, such as in e.g. telecom billing systems, since this data is usually not normal distributed, but likelier "fat tailed" or mixed, or simply unknown to the analyst. Another characteristic of data generated due to e.g. human activity is the dynamic properties. It changes over time, so that the same value can be an insider at one time and an outlier at another time.

Further, this type of data is often streamed and extensive to a degree that it cannot all be stored and processed at the same place at the same time, at least not without considerable associated cost. Re-processing of the same data is time consuming and costly.

Because of the above, it would be desirable to have an adaptive analysis method that solved these problems, a method that efficiently adapts to the data at hand, and which is dynamic so that it can be tweaked to handle changes in input, or changes in desired output. It must also produce reliable output data, and it must be able to detect intermittent outliers, as well as insiders in the fat tail.

The problems are solved by embodiments of the present invention.

Figure 1:
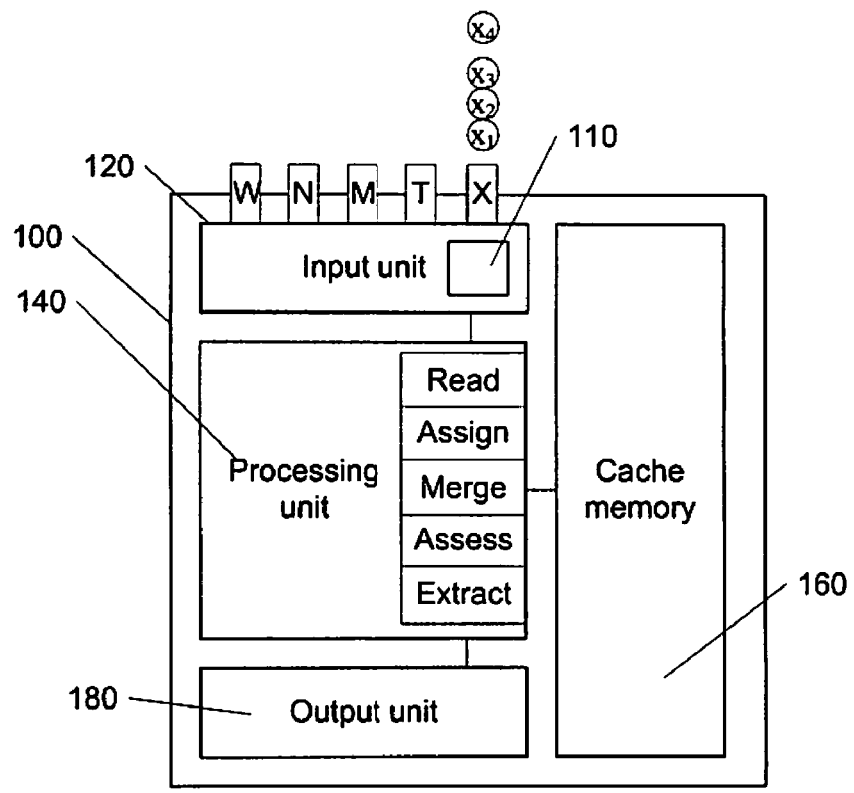
FIG. 1 is a schematic illustration of an apparatus according to one embodiment of the present invention.
Figure 2:
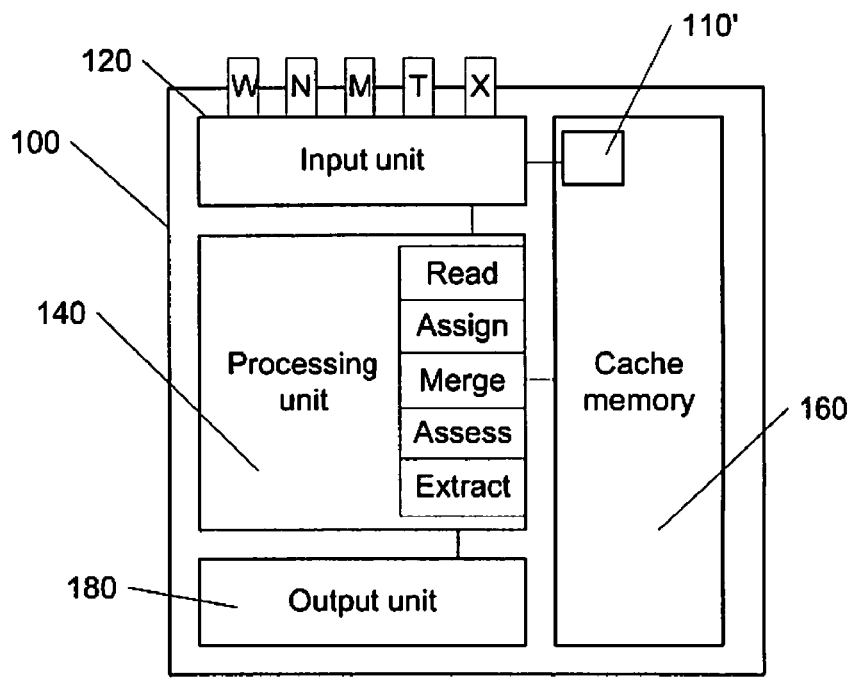
FIG. 2 is a schematic illustration of an apparatus according to another embodiment of the present invention.

The apparatus will now be described in relation to the accompanying drawings. In FIG. 1, streamed data X, for instance of Customer Data Record (CDR) type, generated in a telecom network, arrives sequentially to an input unit 120. The inbound data can be placed in an inbound data queue buffer 110 comprised in the input unit 120 itself, or in cache memory 160 or in a partition 110' of cache memory 160 to which the input unit 120 can be connected. This is illustrated in FIG. 2.

The input unit 120 is connected to a processing unit 140 capable of reading the contents of the inbound data queue buffer, either directly from the partition in cache memory 160 or via the input unit 120. The data is read in a First In First Out manner.

The cache memory 160 is adapted to store data posts representative of bins, as well as items assigned to, and counters and flags associated with, each bin.

The processing unit 140 is adapted to manage bins, i.e. create, update, merge and extract data from bins stored in the cache memory 160 to which it is connected, as well as adapted to assign items, and associate counters and flags to bins.

The spatially and temporally adaptive bin with dynamic expanding range is one of the important features of embodiments of the present invention. Each bin is defined by a fix bound and an expanding bound, and the bounds and the processed data are of the same type. In the further description, the bounds are closed, but alternatively, they could be open. A weight counter C is associated with each bin. The weight counter C of a particular bin is indicative of the number of items currently assigned to that bin. This is an advantage, since it enables direct bin assessment, without having to recount every item of every bin several times. Each bin can also carry a flag indicative of whether the bin has been identified as an insider bin. The data themselves can also carry flags, indicating identity as insider or outlier. These counters and flags can be represented in different ways in the cache memory 160.

For the sake of simplicity we here assume that the data type is an integer, but it could also be a composite object type containing integers and/or real numbers. The data itself can be univariate or multivariate, but for the purpose of the continued exemplification, the data is univariate.

Via the input unit 120 an operator can also input window size W, margin M, portion size N, and threshold T. The window size W is chosen so that the output function $f(X_\infty) \approx f(X_W)$. The operator may want to analyze a certain set/amount of data, or may want an output within a particular timeframe, or with a certain periodicity.

The absolute value, or modulus |M|, of margin M, denotes the distance within which an item must lie to at least one item assigned to a particular bin, in order to eventually be assigned to that bin itself. If M>0, the fix bound is the low bound and the expanding bound is the high bound, and vice versa.

The threshold T denotes how many items must be assigned to a bin before it is identified, and flagged, as an insider bin. Appropriate values for M and T are chosen by the operator on the basis of experience, characteristics of the data and depending on the desired output. By varying T and |M|, the operator might influence the eventual amount of reported outliers. For instance, if it is more important to detect all true outliers, at the expense of potentially including some false outliers, then T and/or |M| may be set to values in the lower range. However, if it is more important to only detect true outliers, potentially at the expense of some false insiders, then T and/or |M| may be set to values in the higher range.

The portion size N is dependent upon the capacity of the cache memory 160. N denotes the number of items in a sub-stream of the total data stream $X_W$ to be processed, after which a merger of bins takes place, thus freeing up memory for a new portion of N items to be assigned. Ideally, N is chosen so that the cache memory 160 is used to its maximum when a full portion of N items has been assigned, but that the cache memory 160 is never so full that the memory allocation process is being slowed down.

The output unit 180 can deliver the results of the analysis in different ways, some of which are described in relation to the delivering output step 260 below.

The integers W and N should be chosen while taking into account the capacity of the cache memory 160. Once N has been processed, a merging step will take place, after which insider bins can be detected and their assigned data removed from the cache memory 160 to leave room for the next N items. The removed data can then be discarded or sent forward to the output unit 180 as cleansed data, depending on the desired output format.

Figure 3:
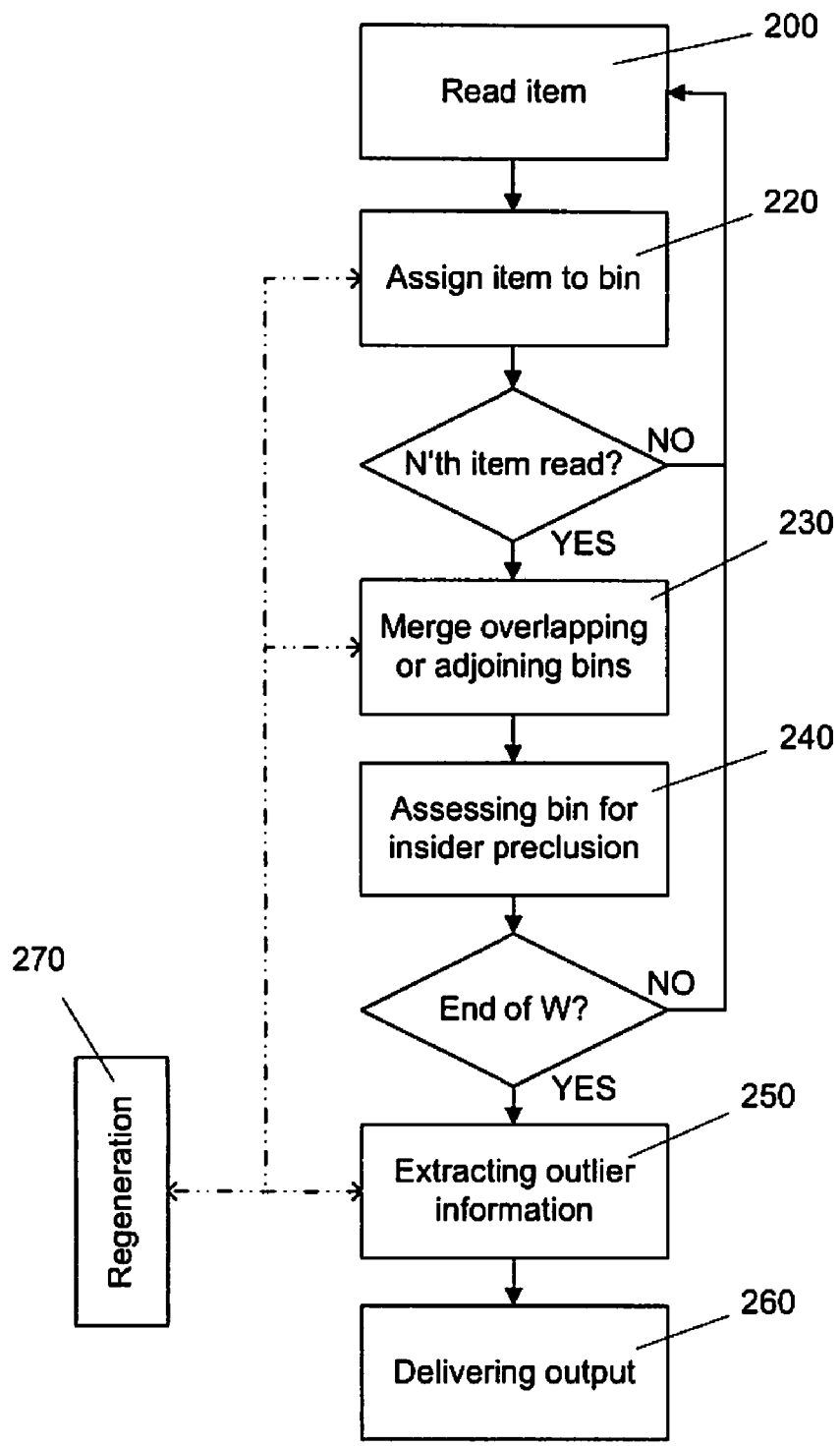
FIG. 3 is flowchart of a method according to one embodiment of the present invention.

The method will now be described in relation to the accompanying drawings. In FIG. 3, the streamed data $X_W$ arrives sequentially, and is being placed in an inbound data queue buffer comprised in or connected to the input unit 120.

In a reading step 200, the item x next in line is being read by the processing unit 140 in a First In First Out manner.

In an assigning step 220, the processing unit 140 is assigning each item x to a bin having a range that comprises item x. This can for instance be done such that the processing unit 140 is matching x against each bin range. If there is a match, e.g. if there exists a bin B with a range that comprises item x, then x is assigned to bin B, and the weight counter C associated with bin B is incremented by one.

If there is a match and if the newly assigned item x lies within a margin M from the expanding bound of bin B, then B is expanded so that B's expanding bound is redefined as x+M.

However, if there is no match among the current bins, a new bin is being adaptively created so that its fix bound equals x and its expanding bound equals x+M, x is assigned to this new bin, and the new bin's weight counter C is set to 1. The value of M can be input by the operator.

If the actual cleansed data and/or actual outliers are the desired output, the item x is actually stored internally, in conjunction with the bin. Otherwise, this is not necessary, as long as C is incremented and the bin bounds are expanded correctly.

The fact that each bin is defined by a fix bound and an expanding bound, and that the bounds and the processed data are of the same data type is an advantage since it enables an assignment procedure where no effort has to be made on calculating various distance functions or mean values as is the case in e.g. previously known cluster-based outlier detection methods. The adaptive bin, which is allocated where it is needed, i.e. with the fix bound equal to the item, distinguishes the method from previous methods. In e.g. the CORM, the location of k initial cluster centers must be input by the operator, and hence the result may be skewed by the operator's preconceived ideas of where outliers may or may not be found. As a consequence, intermediate outliers appearing in the vicinity of predetermined initial cluster centers will likely be erroneously interpreted as inliers. This inability to correctly detect intermediate outliers is a flaw that the CORM method shares with a majority of existing outlier detection methods.

The secret to solving the problem of detecting intermediate outliers is to create bins only if and when they are needed, and only exactly where they appear. Methods according to embodiments of the present invention show this temporal and spatial adaptability. Because of this, no unnecessary bins are created, processed or stored, and processor load and memory demand is reduced.

The steps 200 and 220 are now repeated until the last item N of the portion has been assigned. The value of N can be input by the operator. It will depend upon the capacity of the cache memory. This iterative property of the method enables it to work also for very large data sets despite very restricted storage capacity.

In a merging step 230, all bins with overlapping or adjoining bounds are being merged. This can for instance be done such that for each bin, it is compared whether its expanding bound is overlapping or immediately adjoining a neighboring bin's fix bound. If this is the case, a merged bin is being created, which has a fix bound identical to the original bins fix bound, and an expanding bound identical to the neighboring bin's expanding bound. Also, the weight counter C of the merged bins is being set to equal the sum of the original and neighboring bins' weight counters C.

When the merging step 230 has been completed, the total number of bins has been reduced, the average bin range is increased and the average bin weight C is increased. This is an advantage since reducing the total number of bins equals a reduced number of data posts in store, which in turn means that space is freed up in the cache memory. It also means that the matching sub-step of the next performing of the assigning step 220 will be quicker, as the next N items of data are matched against fewer bins. The increased average bin weight is an advantage since it optimizes an assessing step 240.

In the assessing step 240 all bins not previously precluded are assessed for insider identification. This can for instance be done such that each bin's weight counter C is being compared to a predefined insider threshold T, and if C≧T, the bin is being identified as an insider bin. It is possible to flag the bin with an insider flag, so as to enable more efficient and quick extraction and avoiding re-assessment of insider bins. Alternatively, the weight counter C can serve as an insider flag. Optionally, the items in every insider bin may be flagged as insider items. If so, this can be done in conjunction with flagging of the bin to which they are assigned. The value of T can be input by the operator.

During the assessing step 240, it is possible to remove all items from each insider bin if it previously had actual items stored in its data post. The items can be discarded or sent forward as cleansed data, depending on the desired output alternative. As long a virtual bin is retained, with boundaries, weight counter and/or flag, the assigning and merging steps can be repeated as before, and there is no use for the actual insider data, unless it is needed for the output report. Henceforth, any items assigned to the insider bin can therefore be directly forwarded as cleansed data or discarded. This frees up memory space. To enable keeping track of the weight of the virtual bin, the weight counter can be maintained and incremented even after insider flagging.

In an embodiment where bins are converted into virtual bins during the assessing step 240, bin items are forwarded as cleansed data to the output unit 180 upon preclusion of its bin. Provided that $f(X_\infty) \approx f(X_W)$, this embodiment enables continuous data cleansing of streamed data, and this is very advantageous.

The above steps are repeated for all N items of each portion and for each portion of the window W. Even though the assessing step 240 follows after the merging step 230 in the above description, it is possible to use another sequence, due to the iterative properties of the method.

In an extracting step 250 it is being verified that all data in the subscriber data file $X_W$ have been processed, that is, read, assigned, merged and assessed, before the result is being extracted.

Extracting can for instance be done such that the processing unit 140 retrieves, from the cache memory 160, the bounds of those bins that remain un-precluded or un-flagged or that have a weight counter C<T. This output is an indication of firstly that outliers have been found, which is in itself a result, and also gives detailed information on the location of the outlier items. If this output is sufficient, no intermittent storing of data is necessary, and the cache memory 160 can exclusively store virtual bins. The actual data is only needed as far as the assigning step 220 for matching and defining/redefining of bounds, and C keeps track of the bin weight at least until that bin has been assessed as an insider bin and precluded. After that, C is no longer needed either. Optionally, the bins that are not precluded, or flagged as insiders, at this time may be flagged as outlier bins. Optionally, the items in every bin flagged outlier may then be flagged as outlier items.

However, in the event that the exact location of the outliers is wanted, the data is intermittently stored in the data post representing its bin, at least until the bin has been assessed as an insider bin and precluded, by which its data can be discarded or sent forward to the output unit 180 as cleansed data. Though yielding slightly higher storage requirements, this method still saves considerable memory compared to previously known methods. Alternatively, the wing items only, i.e. the smallest and the largest item in each bin could optionally be discarded to save memory, as they can be regenerated via its bin bounds. If so, the assigning step 220, merging step 230 and extracting step 250 are supplemented, as illustrated by the dash-dotted line, with a regeneration sub-step 270 that is regenerating wing items from bounds. Since the wing items and the bounds are of the same value type, no value type conversion must be made, and hence there is an advantageous reduction in processor load. If M>0, the low wing is regenerated from the fix bound, i.e. low wing=fix bound, the high wing is regenerated from the expanding bound, i.e., high wing=expanding bound—M; and vice versa. The bin counter C or the bin bounds are not affected by the regeneration sub-step 270.

In a delivering output step 260, output is delivered to the output unit 180. Firstly, output step 260 can deliver a single statement regarding the occurrence of outliers, i.e. "outliers found" or "no outliers found". This is an advantage since the mere existence of outliers indicates abnormal running conditions from which significant performance degradation may result. For instance, it may indicate that this particular user from whom the data originates is behaving in an undesirable way and perhaps against regulations or contract. Spammers and canvassers e.g. can be detected in this way.

Secondly, output step 260 can deliver the bounds of the detected outlier bins, or the outliers themselves. This is an advantage since there are different underlying causes of outliers, for instance human error or fraudulent behavior, defective instruments, changes in behavior of systems or system malfunction. Outlier detection and analysis is a way to predict and prevent problems, and is a critical task in many safety critical environments.

Thirdly, output step 260 can output the cleansed data. In an embodiment where the bins are converted into virtual bins during the assessing step 240, bin items are forwarded as cleansed data to the output unit upon preclusion of its bin. Under the presupposition that $f(X_\infty) \approx f(X_W)$ this embodiment enables continuous data cleansing of streamed data, with very little memory, which is of course a great advantage.

Fourthly, output step 260 can output a list of all bins identified as insider bins and/or outlier bins, represented by their respective bounds only, i.e. without the data itself, and with or without the respective bin weights C. This is useful when the operator wants to trace and/or understand the dynamic property characteristics of one particular data source, and answer questions like: Where are the intermediate outliers occurring? Where are they disappearing or integrating with inliers? How are the locations or ranges of the insider bins changing over time? Analyzing several outputs like these may also indicate for what W's the approximation $f(X_\infty) \approx f(X_W)$ is valid.

When the impact of dynamic property characteristics of a data stream is held at an acceptable level, e.g. by limiting the time scope, this fourth output type is also useful, since the insider bins can then be re-used for a subsequent window W. With bins that are already identified as insider bins no further assessment is needed, regardless of how many additional items are assigned to it. Further, because the bins will for most time have already been expanded and merged, the merging occurrences will be reduced for the same portion size N. The result is faster and/or more accurate processing.

Alternatively, any combination of the above four output alternatives, or parts of them, can be chosen as output from the apparatus 100 and when using the method according to embodiments of the present invention.

Using adaptive bins with expandable ranges solves the problem with finding intermediate outliers, and inliers in the tail. The bins are adaptively created and expanded if, where and when the items are assigned to them. Instead of a complicated distance function, the method uses a simple margin, which can be tweaked by the operator to suit the present conditions. The margin, together with other variable quantities W, T and N also contribute to solving the problem with handling the dynamic property characteristics of certain data, and make the method dynamic.

Because of the iterative properties of the method, and because of the way that the bins are created and assigned to, use of memory can be minimized.

In concord with the problems listed above, the problem of reducing processor load is solved with co-operation of a non-exclusive list of features in synergy. The expanding range, the assessing, assigning and merging steps all contribute to low processor load.

The invention claimed is:

1. A computer-implemented distribution-independent method for iteratively detecting outliers in streamed data comprising the data sequence $X_w$, being sequentially assigned to adaptive bins having expanding range, the method comprising the steps:

reading each item x of $X_w$;

assigning each item x to a bin having a range that comprises item x;

for every N'th read item, wherein N is a predetermined value selected as a function of available memory, merging all bins with overlapping or adjoining ranges;

assessing a bin for insider preclusion;

extracting outlier information when $X_w$ has been processed; and delivering output;

wherein the step of assigning comprises the steps of:
matching x against existing bins' range and, if there is a match, incrementing a bin weight counter C of the matching bin, wherein:
if x lies within a predefined margin |M| from an expanding bound of the bin to which it has been assigned, the expanding bound is expanded to x+M; and,
if there is no match, a new bin is created, having a fix bound=x and an expanding bound=x+M, and an associated bin weight counter C is set to one.

2. The method according to claim 1, where the merging step is comprising the further steps:

determining, for each bin, if its expanding bound is overlapping or immediately adjoining a neighboring bin's fix bound; and if so:

creating a merged bin having a fix bound identical to the original bin's fix bound, and an expanding bound identical to the neighboring bin's expanding bound;

setting a weight counter C of the merged bin equal to the sum of the original and neighboring bins' C's.

3. The method according to claim 1 where the assessing step is comprising the further step:

comparing a weight counter C of the bin to a predefined insider threshold T;

if C≧T, the bin is being identified as an insider bin.

4. The method according to claim 1, where the extracting step is comprising determining whether the entire $X_w$ has been processed; and if so:

identifying as outlier bins all bins not previously identified as insider bins;

extracting from identified outlier bins their respective bin bounds.

5. An apparatus (100) for distribution-independent iterative detection of outliers in streamed data comprising the data sequence $X_w$ sequentially assigned to adaptive bins having expanding range, said apparatus (100) comprising an input unit (120), a processing unit (140), a cache memory (160) and an output unit (180), where said cache memory (160) is adapted to store and alter data posts representing bins upon request, and where said processing unit (140) is adapted to:

send such requests to the cache memory (160);

read via the input unit (120) each item x of $X_w$;

assign each item x to a bin having a range that comprises item x;

merge bins with overlapping or adjoining bounds for every N'th read item, wherein N is a predetermined value selected as a function of available memory;

assess bins for insider preclusion;

extract outlier information when the entire $X_w$ has been processed;

deliver the outlier information to the output unit (180);

match x against existing bins' ranges; and, if there is a match, increment a bin weight counter C of the matching bin; and, if x lies within a margin |M| from the expanding bound of the bin to which it has been assigned, expand the expanding bound to x+M;

if there is no match, create a new bin with fix bound=x and expanding bound=x+M; and, set a bin weight counter C to one.

6. The apparatus according to claim 5, where processing unit (140) is further adapted to:

compare, for each bin, if its expanding bound is overlapping or immediately adjoining a neighboring bin's fix bound; and if so:

create, and store in the cache memory (160), a merged bin with a fix bound identical to the original bin's fix bound, and an expanding bound identical to the neighboring bin's expanding bound;

set a weight counter C associated to the merged bin equal to the sum of the original and neighboring bins' C's.

7. The apparatus according to claim 5 where the processing unit (140) is further adapted to assess the bin through comparing a weight counter C to a predefined insider threshold T; and if C≧T, identify the bin as an insider bin.

8. The apparatus according to claim 5, in which the processing unit (140) is adapted to determine when the entire $X_w$ has been processed;

identify as outlier bins all bins not previously identified as insider bins; and extract and compile an outlier information data file.

9. A computer readable non-transitory media product including program instructions which when executed by a processor cause the processor to perform a distribution-independent method for iteratively detecting outliers in streamed data comprising the data sequence $X_w$, being sequentially assigned to adaptive bins having expanding range, the method comprising the steps:

reading each item x of $X_w$;

assigning each item x to a bin having a range that comprises item x;

for every N'th read item, wherein N is a predetermined value selected as a function of available memory, merging all bins with overlapping or adjoining ranges;

assessing a bin for insider preclusion;

extracting outlier information when $X_w$ has been processed;

delivering output;

matching x against existing bins' range; and, if there is a match, a bin weight counter C of the matching bin is incremented; and, if x lies within a predefined margin IMI from an expanding bound of the bin to which it has been assigned, the expanding bound is expanded to x+M;

if there is no match,
a new bin is created having a fix bound=x and an expanding bound=x+M, and an associated bin weight counter C is set to one.

10. The computer readable product and program instructions according to claim 9 further causing:
determining, for each bin, if its expanding bound is overlapping or immediately adjoining a neighboring bin's fix bound; and if so:
creating a merged bin having a fix bound identical to the original bin's fix bound, and an expanding bound identical to the neighboring bin's expanding bound;
setting a weight counter C of the merged bin equal to the sum of the original and neighboring bins' C's.

11. The computer readable product and program instructions according to claim 9 further causing: comparing a weight counter C of the bin to a predefined insider threshold T, and if $C \geq T$, the bin is being identified as an insider bin.

12. The computer readable product and program instructions according to claim 9 further causing:
determining whether the entire $X_w$ has been processed; and if so:
identifying as outlier bins all bins not previously identified as insider bins;
extracting from identified outlier bins their respective bin bounds.

* * * * *